(12) United States Patent
Crafts et al.

(10) Patent No.: US 6,486,440 B1
(45) Date of Patent: Nov. 26, 2002

(54) REDUNDANT PACKAGE FOR OPTICAL COMPONENTS

(75) Inventors: Douglas E. Crafts; James F. Farrell; Mark B. Farrelly, all of San Jose; Suresh Ramalingam, Fremont, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/901,474

(22) Filed: Jul. 9, 2001

(51) Int. Cl.[7] ................................................. H05B 1/00
(52) U.S. Cl. ........................ 219/209; 219/210; 219/520; 219/385
(58) Field of Search ................................. 219/209, 210, 219/520, 530, 544, 385, 494; 324/760; 331/69; 428/344; 359/512

(56) References Cited

U.S. PATENT DOCUMENTS

| | | | | |
|---|---|---|---|---|
| 3,662,150 A | * | 5/1972 | Hartung ........................ 219/209 |
| 3,883,715 A | * | 5/1975 | Gebo ........................... 219/210 |
| 4,684,783 A | * | 8/1987 | Gore ........................... 219/210 |
| 4,978,914 A | * | 12/1990 | Akimoto et al. ............. 324/760 |
| 5,574,627 A | * | 11/1996 | Porter ........................ 219/209 |
| 5,585,024 A | * | 12/1996 | Kosugi ........................ 219/494 |
| 5,624,750 A | * | 4/1997 | Martinez et al. ............. 428/344 |
| 5,917,272 A | * | 6/1999 | Clark et al. .................. 219/210 |
| 5,919,383 A | * | 7/1999 | Beguin et al. ............... 219/209 |
| 5,994,679 A | * | 11/1999 | DeVeau et al. .............. 219/530 |
| 6,114,673 A | * | 9/2000 | Brewer et al. ............... 219/530 |
| 6,127,660 A | * | 10/2000 | Scafati ......................... 219/209 |
| 6,144,013 A | | 11/2000 | Chu et al. .................... 219/209 |
| 6,330,152 B1 | * | 12/2001 | Vos et al. .................... 219/209 |

* cited by examiner

Primary Examiner—Teresa Walberg
Assistant Examiner—Fadi H. Dahbour
(74) Attorney, Agent, or Firm—Jeff Klembczyk, Esq.

(57) ABSTRACT

A redundant package for optical components includes an inner package enclosing the optical component, and an outer package enclosing the inner package. A heater may be disposed in the inner package proximate the optical component to control its temperature, and to maintain this temperature control, the outer package creates an isolated air pocket around the inner package which thermally insulates the inner package from the outside environment. The outer package is formed of a material having low thermal conductivity, to promote this insulating function. This package is especially useful if the optical component comprises a planar lightwave circuit (PLC), e.g., an arrayed waveguide grating (AWG), which requires tight temperature control and structural integrity to maintain the integrity of the optical paths.

30 Claims, 4 Drawing Sheets

REDUNDANT PACKAGE FOR OPTICAL COMPONENTS

FIELD OF THE INVENTION

The present invention relates to component packaging. More particularly, the present invention relates to a redundant package for isolating optical components (e.g., arrayed waveguide gratings) from external stresses.

BACKGROUND OF THE INVENTION

Fiber optic communication links have been conventionally employed in long-haul, point-to-point networks with controlled environments at all interface points. Such highly controlled, "central office" surroundings usually offer relatively benign operating environments (temperature, humidity, mechanical) for components. Consequently, highly functional components could be developed and installed without considering the impact of other, more extreme environments.

Recent technological advances, coupled with increasing bandwidth demand, are rapidly expanding the use of fiber optic components beyond the "central office" and into potentially harsher environments. For example, dense wavelength division multiplexing (DWDM) enables the transmission of multiple, independent wavelength streams across a single fiber. Predictably, this capability has resulted in the requirement to add or drop these optical channels along the previously untapped long lengths of fiber (and outside of the central office environment) to provide access to the individual wavelength streams. Optical add/drop multiplexers (OADMs) are employed for this function, enabled by arrayed waveguide grating (AWG) components for filtering and forwarding individual wavelengths.

In addition to these technological advances, simple market forces are pushing fiber networks beyond central offices and into the diverse terrain of "metro" markets. This ever-increasing need for bandwidth which only fiber can deliver is resulting in the widespread deployment of fiber networks, and their associated components, into the harsher, less environmentally controlled conditions present in the metro market.

The demands placed on component designers now reach far beyond optical performance, and into the realms of thermal and mechanical insulation. Certain qualification standards (e.g., Telcordia) exist for reliability of optical components, and many customers require qualification under these standards. AWGs however are thin, fragile chips with narrow waveguides produced using planar lightwave circuit (PLC) processing techniques. The various processing tolerances required to meet the requisite optical specifications are already very tight, and in fact get tighter as the need to process more and closer channels increases. It is difficult and costly to impose yet additional requirements on the chip process in the form of advanced materials, processing techniques, etc. to satisfy the harsher environmental standards discussed above.

Environmentally secure packages therefore now play a vital role in the widespread commercialization of these devices. Without adequate packaging, components such as AWGs, with their highly unique and useful functions, would be relegated to laboratory environments only.

What is required, therefore, are advanced packaging techniques to enable the widespread use of otherwise fragile optical components in diverse and often stressful environments.

SUMMARY OF THE INVENTION

These requirements are met, and further advantages are provided, by the present invention which in one aspect is an optical component package having a first, inner package enclosing the optical component, and a second, outer package enclosing the inner package. A heater may be disposed in the inner package proximate the optical component to control the temperature thereof, and to maintain this temperature control, the outer package forms an isolated sealed airspace around the inner package. This isolated airspace thermally insulates the AWG device environment from the outside ambient environment. The thermal isolation reduces the power consumption required to maintain tight temperature control of the device and reduces thermally induced mechanical stresses which could negatively affect the device performance or reliability. These parameters are critical to the commercial viability of the device. The outer package is formed of a material having low thermal conductivity, to promote this insulating function.

The heater may be formed of a material having a coefficient of thermal expansion substantially matched to that of the optical component, to minimize thermal differences and the resultant stresses at the interface between these elements.

The inner package, in one example, is formed from a base, a heater affixed to the base, and the optical component is affixed to the heater. Sidewalls are affixed to the base around the heater, and a lid is affixed over the sidewalls.

This package is especially useful if the optical component comprises a planar lightwave circuit (PLC), e.g., an arrayed waveguide grating (AWG), which requires tight temperature control and structural integrity to maintain the integrity of the optical paths.

BRIEF DESCRIPTION OF THE DRAWINGS

The subject matter which is regarded as the invention is particularly pointed out and distinctly claimed in the concluding portion of the specification. The invention, however, both as to organization and method of together with further objects and advantages thereof, may be best understood by reference to the following detailed description of the preferred embodiment(s) and the accompanying drawings in which:

BEST MODE FOR CARRYING OUT THE INVENTION

Figure 1:
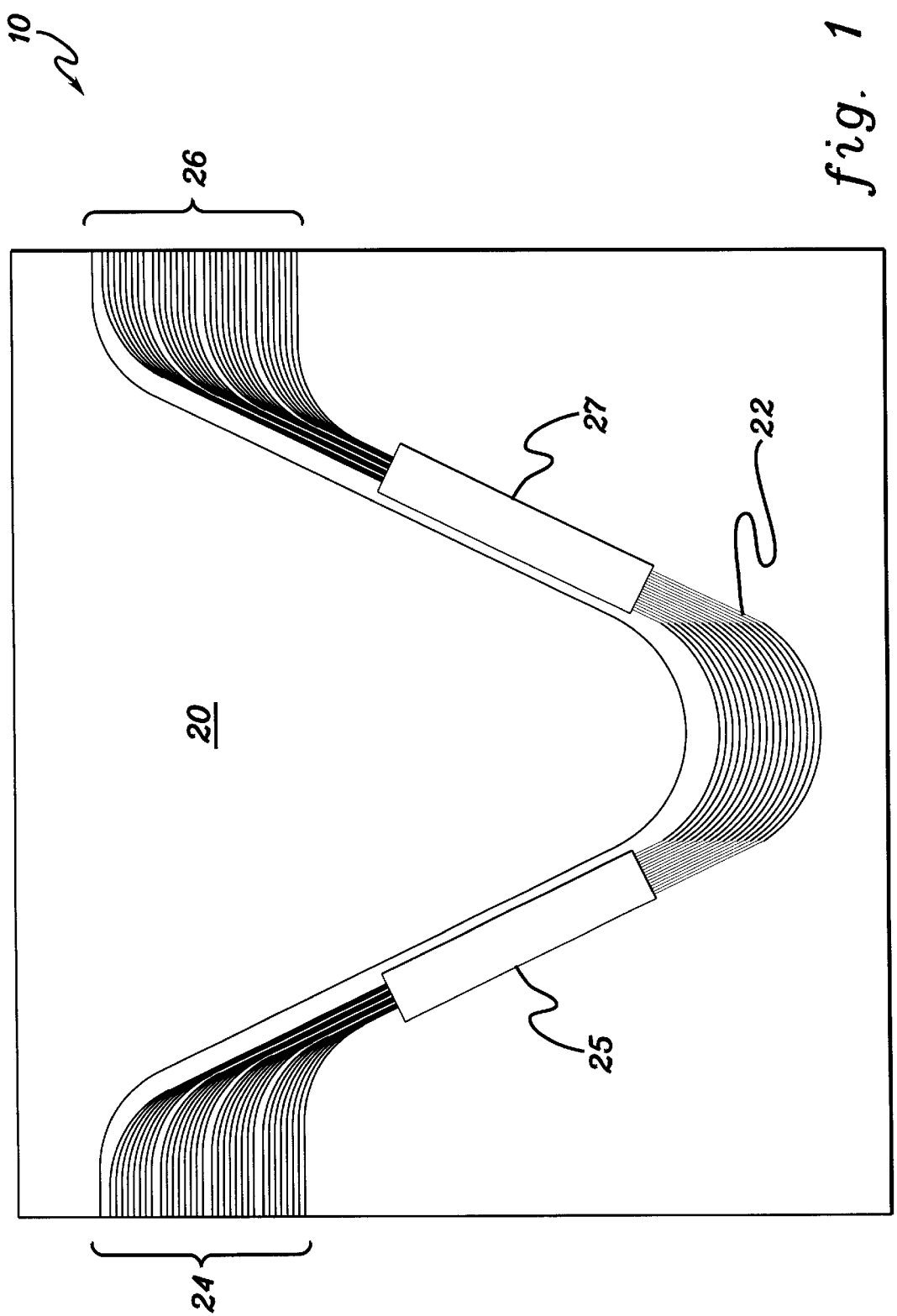
FIG. 1 is a typical AWG PLC requiring packaging.

With reference to FIG. 1, an exemplary planar lightwave circuit (PLC) 10 is shown with an arrayed waveguide grating (AWG) 22 on a substrate 20 (e.g., silicon). As known to those in the art, an AWG uses an array of waveguides 22 having carefully controlled, differing path lengths which cause constructive phase interference patterns on the optical signals transmitted therein. This technique is useful for multiplexing or demultiplexing optical signals passed between the array input/focusing region 24/25 to the array output/focusing region 26/27. The tight spatial and thermal tolerances necessary for proper operation of array 20, as discussed above, lead to the requirements for effective packaging and sealing for use in adverse environmental conditions.

Figure 2:
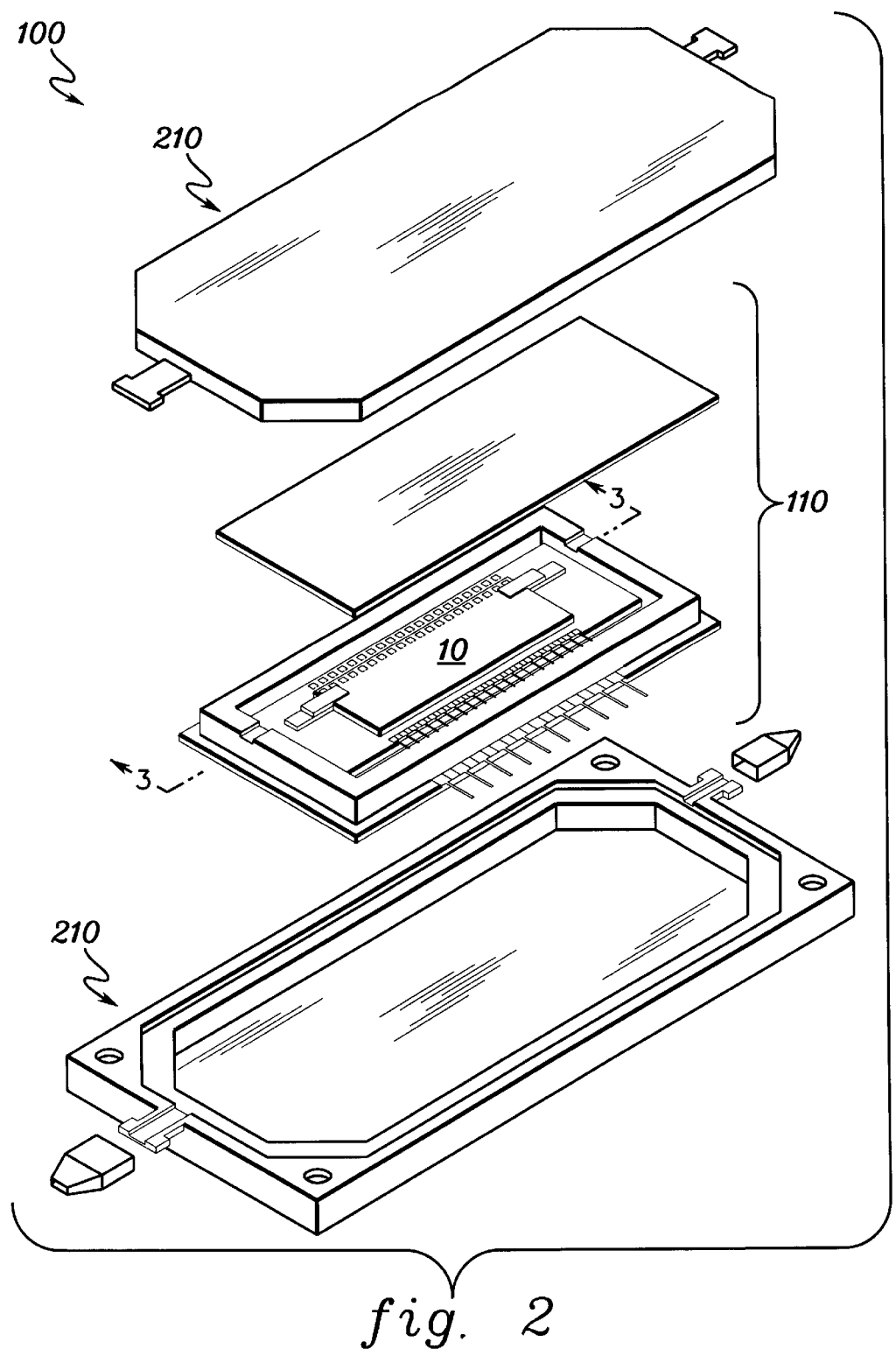
FIG. 2 is an exploded view of the redundant package of the present invention including a PLC mounted in an inner package.

In accordance with the present invention, and with reference to FIG. 2, a redundant package 100 is disclosed having an inner package 110 within which the PLC 10 is mounted, and an outer package 210 for enclosing the inner package. As discussed further below, both packages are designed with appropriate materials and structures to maximize thermal and mechanical insulation from surrounding environments.

Figure 3:
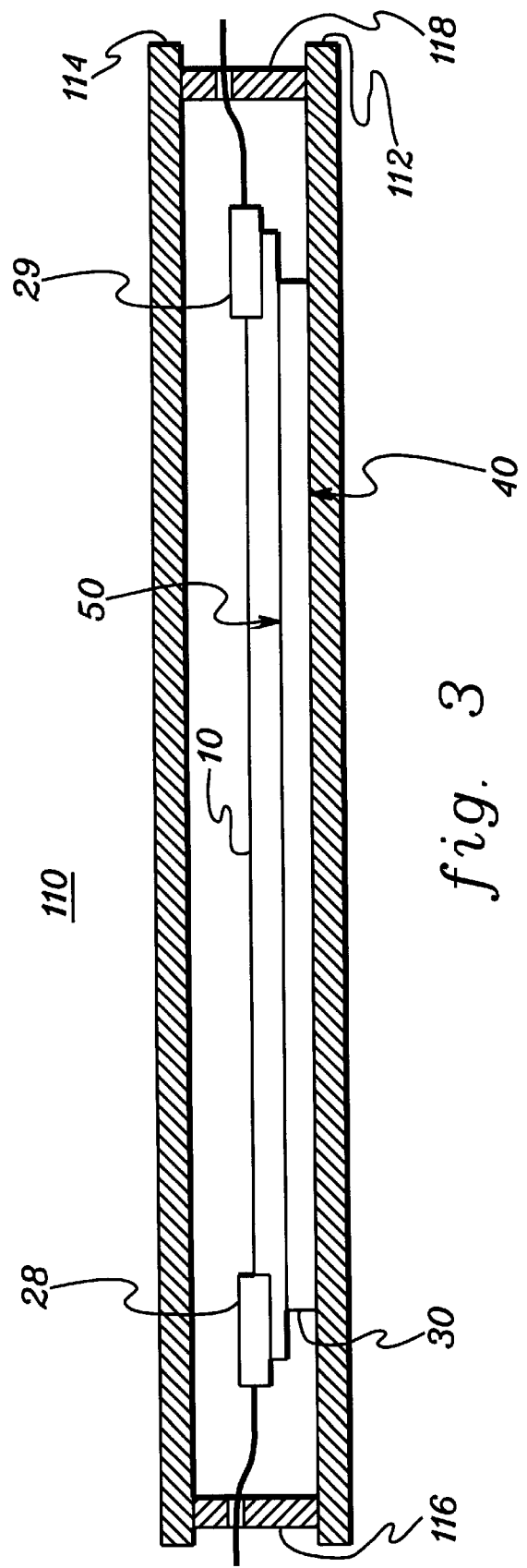
FIG. 3 is a cross-sectional view of the inner package containing the PLC.

For example, and with reference to FIG. 3 (a cross-sectional view of the inner package along line AA) the base 112 of this inner package is similar to a PC board and is formed from FR5, a type of fiberglass reinforced plastic. A heater element 30 formed of aluminum nitride is surface-mounted onto base 112, at interface 40. A layer of J-leads (not shown) may also be disposed at this interface. Heater 30 is used to ensure that PLC 10 is maintained at a constant temperature (very uniformly across its surface), since temperature changes will cause minor structural changes in AWG signal paths, and negatively impact its optical performance.

Silicon PLC 10 is then mounted onto heater 30 at interface 50 using, for example, a low modulus silicon material. Aluminum nitride is chosen for heater 20 since its coefficient of thermal expansion (CTE) is approximately matched to that of the silicon PLC, thus preventing any adverse thermomechanical stress at this interface. Other materials with similar thermal conductivities combined with Si-matched CTEs would serve similar function. These materials may include Si Carbide or Si. Such materials in general are highly thermally conductive, providing high uniformity of temperature across the heater.

Package walls 116, 118 are also formed from FR5, and joined to base 112 using an epoxy. V-groove arrays 28 and 29 on PLC 10 provide the interface to input and output fiber ribbons, which are carried out of the package over upper recesses in the sidewalls, and FR5 lid 114 is then epoxied in place over walls 116 and 118. The recessed sidewall openings are also sealed with epoxy.

Figure 4:
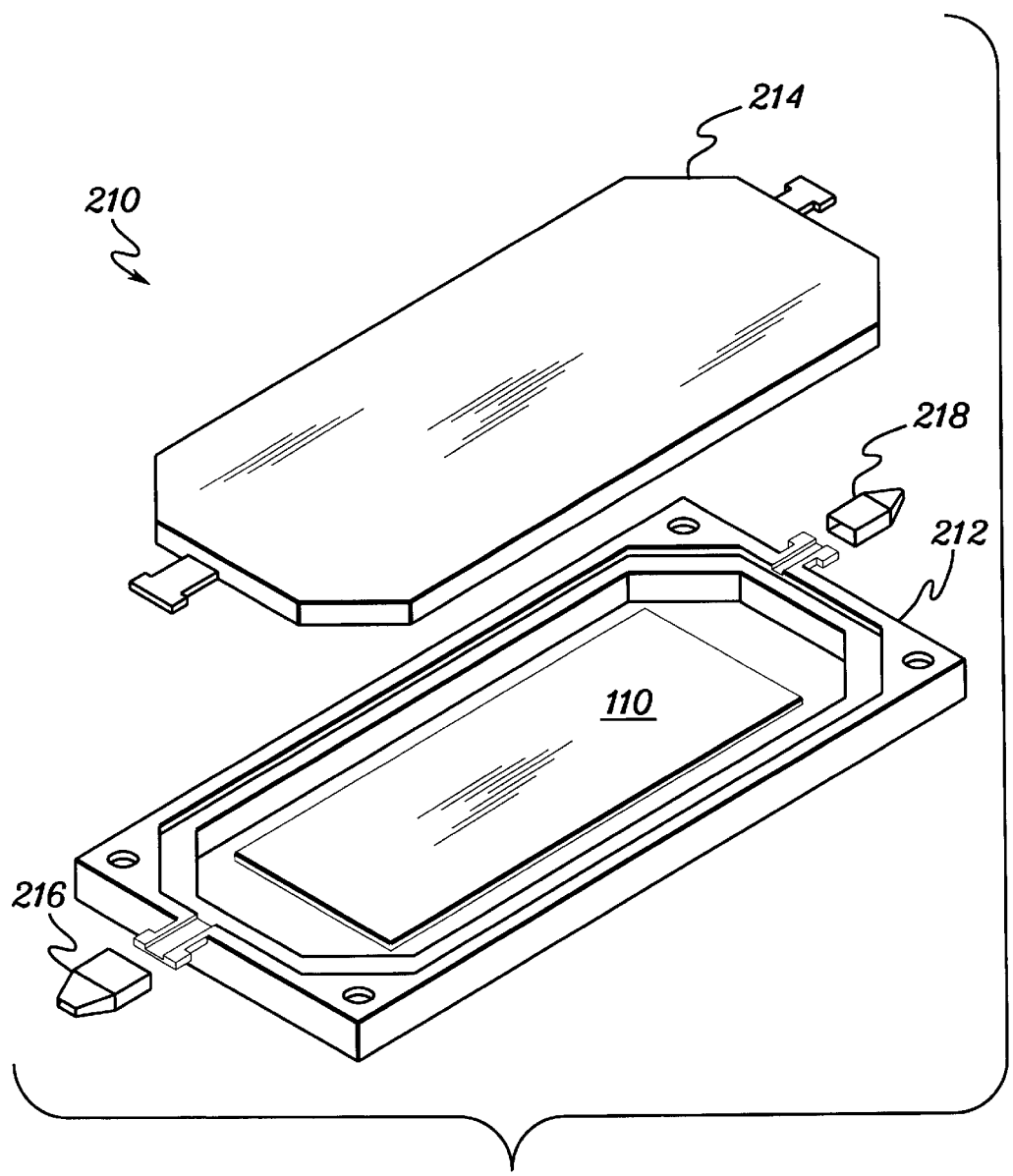
FIG. 4 is an exploded view of the outer package of the present invention.

With reference to the exploded view of the outer package 210 of FIG. 4, this package is formed from polycarbonate plastic (which is highly non-thermally conductive). An epoxy is used to affix the inner package 110 into base 212, and lid 214 is then affixed and sealed to the base using a silicon epoxy. The fiber input and output ribbons are accommodated through the side ports, with strain reliefs 216 and 218. These ports are sealed using epoxy also. The isolated airspace created around the inner package by the outer package thermally insulates the AWG device environment from the outside ambient environment. The thermal isolation reduces the power consumption required to maintain tight temperature control of the device and reduces thermally induced mechanical stresses which could negatively affect the device performance or reliability. These parameters are critical to the commercial viability of the device. The outer package is formed of a material having low thermal conductivity, to promote this insulating function.

The inner package of the present invention maintains tight temperature control around the highly temperature-sensitive optical component (e.g., PLC/AWG). The redundant, outer package ensures this tight control by the airspace insulation, and through the choice of non-thermally conductive materials. Moreover, the redundant outer package ensures greater structural integrity, and additional sealing from humidity and other environmental factors.

While the invention has been particularly shown and described with reference to preferred embodiment(s) thereof, it will be understood by those skilled in the art that various changes in form and details may be made therein without departing from the spirit and scope of the invention.

What is claimed is:

1. An optical component package, comprising:
   a first, inner package enclosing the optical component; and
   a second, outer package enclosing the inner package, wherein the inner package comprises:
   a base; and
   a heater affixed to the base with a layer of J-leads, wherein the optical component is affixed to the heater.

2. The component package of claim 1, wherein the outer package creates an isolated air space around the inner package which thermally insulates the component from the outside environment.

3. The component package of claim 2, wherein the outer package is formed of a material having low thermal conductivity.

4. The component package of claim 1, wherein the heater is formed of a material having a coefficient of thermal expansion substantially matched to that of the optical component, with high thermal conductivity and therefore high temperature uniformity.

5. The component package of claim 1, wherein the optical component comprises a planar lightwave circuit (PLC).

6. The component package of claim 5, wherein the PLC comprises an arrayed waveguide grating.

7. The component package of claim 1, further comprising:
   sidewalls affixed to the base around the heater; and
   a lid affixed over the sidewalls.

8. The component package of claim 1, wherein the heater is formed of a material having a coefficient of thermal expansion substantially matched to that of the optical component.

9. An optical component package, comprising:
   a first, inner package enclosing the optical component; and
   a second, outer package enclosing the inner package, wherein the inner package comprises:
   a base;
   a heater affixed to the base, wherein the optical component is affixed to the heater;
   sidewalls affixed to the base around the heater; and
   a lid affixed over the sidewalls.

10. The component package of claim 9, wherein the heater is formed of a material having a coefficient of thermal expansion substantially matched to that of the optical component.

11. The component package of claim 9, wherein the optical component comprises a planar lightwave circuit (PLC).

12. The component package of claim 11, wherein the PLC comprises an arrayed waveguide grating.

13. The component package of claim 11, wherein the inner and outer packages each have at least one fiber port for carrying optical signals to and/or from the PLC.

14. The component package of claim 9, wherein the outer package creates an isolated air space around the inner package which thermally insulates the component from the outside environment.

15. The component package of claim 14, wherein the outer package is formed of a material having low thermal conductivity.

16. A method for packaging an optical component, comprising:
- enclosing the optical component in a first, inner package;
- enclosing the inner package in a second, outer package;
- providing a base for the inner package;
- affixing a heater to the base with a layer of J-leads; and
- affixing the optical component to the heater.

17. The method of claim 16, wherein the outer package creates an isolated air space around the inner package which thermally insulates the device from the outside environment.

18. The method of claim 17, further comprising:
- forming the outer package from a material having low thermal conductivity.

19. The method of claim 16, further comprising:
- forming the heater from a material having a coefficient of thermal expansion substantially matched to that of the optical component, with high thermal conductivity and therefore high temperature uniformity.

20. The method of claim 16, wherein the optical component comprises a planar lightwave circuit (PLC).

21. The method of claim 20, wherein the PLC comprises an arrayed waveguide grating.

22. The method of claim 16, further comprising:
- affixing sidewalls to the base around the heater; and
- affixing a lid over the sidewalls.

23. The method of claim 16, further comprising:
- forming the heater from a material having a coefficient of thermal expansion substantially matched to that of the optical component.

24. A method for packaging an optical component, comprising:
- enclosing the optical component in a first, inner package;
- enclosing the inner package in a second, outer package;
- providing a base for the inner package;
- affixing a heater to the base;
- affixing the optical component to the heater;
- affixing sidewalls to the base around the heater; and
- affixing a lid over the sidewalls.

25. The method of claim 24, further comprising:
- forming the heater from a material having a coefficient of thermal expansion substantially matched to that of the optical component.

26. The method of claim 24, wherein the optical component comprises a planar lightwave circuit (PLC).

27. The method of claim 26, wherein the PLC comprises an arrayed waveguide grating.

28. The method of claim 26, wherein the inner and outer packages each have at least one fiber port for carrying optical signals to and/or from the PLC.

29. The method of claim 24, wherein the outer package creates an isolated air space around the inner package which thermally insulates the device from the outside environment.

30. The method of claim 29, further comprising:
- forming the outer package from a material having low thermal conductivity.

* * * * *